United States Patent
Suh

(10) Patent No.: US 10,090,551 B2
(45) Date of Patent: Oct. 2, 2018

(54) STRUCTURE FOR MOUNTING FUEL CELL STACK

(71) Applicant: Hyundai Motor Company, Seoul (KR)

(72) Inventor: Jung Do Suh, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 316 days.

(21) Appl. No.: 14/933,790

(22) Filed: Nov. 5, 2015

(65) Prior Publication Data

US 2016/0308239 A1  Oct. 20, 2016

(30) Foreign Application Priority Data

Apr. 17, 2015 (KR) .................. 10-2015-0054602

(51) Int. Cl.
*H01M 8/2404* (2016.01)
*H01M 8/248* (2016.01)

(52) U.S. Cl.
CPC ......... *H01M 8/2404* (2016.02); *H01M 8/248* (2013.01)

(58) Field of Classification Search
CPC ............................ H01M 8/2404; H01M 8/248
See application file for complete search history.

(56) References Cited

U.S. PATENT DOCUMENTS

| 3,994,539 | A | * | 11/1976 | Gottlieb | ............... | F15B 15/1414 |
| | | | | | | 384/49 |
| 8,377,604 | B2 | | 2/2013 | Nakajima et al. | | |
| 2005/0277012 | A1 | | 12/2005 | Inagaki | | |
| 2007/0042250 | A1 | | 2/2007 | Inagaki | | |
| 2009/0004533 | A1 | | 1/2009 | Tanaka et al. | | |

FOREIGN PATENT DOCUMENTS

| CN | 102157747 A | 8/2011 |
| JP | 58-119170 A | 7/1983 |
| JP | 11-97054 A | 4/1999 |
| JP | 2001-143742 A | 5/2001 |
| KR | 1999-0051433 A | 7/1999 |
| KR | 10-0700185 B1 | 3/2007 |
| KR | 10-2009-0097709 A | 9/2009 |
| KR | 10-2011-0083407 A | 7/2011 |
| KR | 20-2012-0004800 U | 7/2012 |
| KR | 10-2013-0028185 A | 3/2013 |

\* cited by examiner

*Primary Examiner* — Ula C Ruddock
*Assistant Examiner* — Thomas H. Parsons
(74) *Attorney, Agent, or Firm* — McDermott Will & Emery LLP

(57) ABSTRACT

A structure for mounting a fuel cell stack in an enclosure or a frame includes a first mounting mechanism for fastening and mounting a first mounting part located at a first side of the fuel cell stack in a longitudinal direction of the stack, which is a cell stacking direction, to the enclosure or the frame in a completely fixing fashion, and a second mounting mechanism for mounting a second mounting part located at a second side of the fuel cell stack in the longitudinal direction of the stack to the enclosure or the frame in a state of being movable in the longitudinal direction of the stack.

8 Claims, 6 Drawing Sheets

(STACK WITH REDUCED FASTENING FORCE) (REPAIRED STACK)

$$L_{original} = L_{repaired} + L_{original}$$
$$L_{original} > L_{repaired}$$

STRUCTURE FOR MOUNTING FUEL CELL STACK

CROSS-REFERENCE TO RELATED APPLICATION

This application claims, under 35 U.S.C. § 119(a), the benefit of priority to Korean Patent Application No. 10-2015-0054602, filed on Apr. 17, 2015 with the Korean Intellectual Property Office, the entire contents of which are incorporated herein by reference.

TECHNICAL FIELD

The present disclosure relates to a structure for mounting a fuel cell stack. More particularly, it relates to an improved structure for mounting a fuel cell stack that mounts a fuel cell stack in an enclosure, or a frame, without structural modification when a stack length (length in a cell stacking direction) is changed without restricting a degree of freedom to change the dimensions in a longitudinal direction of the stack.

BACKGROUND

A fuel cell is an energy converting device that converts chemical energy of fuel into electric energy through an electrochemical reaction. The fuel cell may be used not only to supply power for industries, homes, and vehicles but also to supply power to small-sized electric/electronic products and portable devices.

In recent years, much research has been conducted into a polymer electrolyte membrane fuel cell (PEMFC) having high electric power density as a fuel cell for vehicles.

FIG. 1 is a view showing a configuration of a unit cell of a fuel cell. A fuel cell stack may have the following configuration.

A membrane-electrode assembly (MEA) 101 as a main component is located at the innermost portion of the unit cell. The membrane-electrode assembly 101 includes a solid polymer electrolyte membrane for moving hydrogen ions, and electrode layers, such as a cathode and an anode, formed by coating a catalyst on opposite sides of the electrolyte membrane.

In addition, gas diffusion layers (GDL) 102 are stacked on outsides of the membrane-electrode assembly 101, at which the cathode and the anode are located, and bipolar plates 103, each having a flow field through which reaction gases (hydrogen as a fuel gas and oxygen or air as an oxidizing gas) are supplied and a coolant flows, are located at outsides of the gas diffusion layers 102.

In addition, gaskets 104 for sealing a fluid are interposed between the bipolar plates 103. The gaskets 104 are generally provided in a state in which the gaskets 104 are integrally formed at the membrane-electrode assembly 101 or the bipolar plates 103.

The above components constitute a unit cell. A plurality of cells 110 are stacked, the stacked cells 110 are arranged between end plates, and the end plates are coupled to each other to constitute a fuel cell stack.

Each unit cell maintains a low voltage during operation. For this reason, several tens to several hundreds of cells 110 are stacked in series to increase voltage and are then used as a power generating device, the most general shapes of which are shown in FIGS. 2 and 3.

A fuel cell stack 100 is mainly assembled and fastened in a bolt fastening fashion, shown in FIG. 2, and a fastening bar fastening fashion shown in FIG. 3.

In the bolt fastening fashion, as shown in FIG. 2, cells 110 and end plates 120 are stacked with bolts 131 each having a larger length than the stack inserted through the end plates 120. Nuts 132 are fastened to opposite ends of the bolts 131 such that the end plates 120 do not move.

The bolt fastening fashion has an advantage in that it is possible to fasten and fix the components of the stack 100 in a compressed state using a fastening force of the bolts and the nuts without using additional press equipment.

In the fastening bar fastening fashion, as shown in FIG. 3, cells 110 are stacked, end plates 120 are coupled to opposite ends of the stacked cells 110, fastening bars 133 are put on the end plates 120 in a state in which the end plates 120 are pressed using press equipment, and the fastening bars 133 are fastened to the end plates 120 using bolts 134.

The fastening bar fastening fashion has an advantage in that dead volume is minimized, and therefore the fuel cell stack is advantageous in terms of packaging when applied to a vehicle.

The end plates 120 located at the opposite ends of the stack 110 pressurize the bipolar plates while supporting the bipolar plates in a state in which the stack is fastened. Fastening of the stack is achieved using mechanisms, such as fastening bars, in a state in which uniform surface pressure is maintained over the entire area of each of the bipolar plates.

After the stack is fastened, the opposite end plates 120 are drawn toward each other to maintain surface pressure. At this time, repulsive force is generated due to elasticity of the gas diffusion layers and the gaskets. As a result, tensile force is applied to the mechanisms, such as fastening bars, thus maintaining equilibrium of static force.

Surface pressure between cells has a great effect on the total output of the fuel cell stack. Since the surface pressure in the stack is directly related to ohmic loss due to the increase of contact resistance and mass transfer resistance in the gas diffusion layers, appropriate maintenance of fastening force is a requisite condition in order to obtain good stack performance.

When the surface pressure is too low, the contact resistance between the bipolar plate/gas diffusion layer/membrane-electrode assembly is increased, resulting in current-voltage drops. When the surface pressure is too high, the gas diffusion layers are excessively compressed with the result that gas diffusion is difficult, thereby lowering stack output.

Reduction of the fastening force due to aging of the stack may cause a reduction of surface pressure on the gaskets as well as reduction of the output performance of the stack, resulting in poor airtightness of the reaction gases and the coolant.

In addition, the surface pressure may be reduced due to thermal shrinkage of the gaskets applied to the bipolar plates at a lower temperature of −30 to −20 C. When the surface pressure is excessively reduced, poor airtightness may result.

In addition, when the surface pressure of the gas diffusion layers is lowered due to a reduction of the fastening force, contact resistance between the gas diffusion layer and the bipolar plate and between the gas diffusion layer and the membrane-electrode assembly is increased. This results in an increase in ohmic loss, thereby lowering efficiency of the fuel cell.

Reduction of the fastening force and the surface pressure is caused by the hardening of the gas diffusion layers due to operation of the stack and reduction of elastic force due to deterioration of the gaskets.

When the temperature of the fuel cell stack is lowered to a lower temperature approximate to a glass transition temperature Tg of rubber, which is a material constituting the gasket, elasticity of the rubber is gradually lowered. At this time, since the thermal coefficient of expansion of the gasket is higher than that of the fastening bar, which is made of metal, the gasket shrinks much more with the result that the surface pressure of the gasket is lowered.

In order to solve the reduction in surface pressure of the gas diffusion layers and the gaskets (reduction in fastening force of the stack and poor airtightness), a method of mounting an insert to the inside of each fastening bar of the stack with reduced surface pressure, a method of further inserting a dummy cell, a method of replacing each fastening bar with a short fastening bar, and a method of mounting an elastic mechanism are used.

FIG. 4 is a view exemplarily showing a case in which an insert is mounted between each fastening bar and a corresponding end plate to repair the stack. The stack where a fastening force (surface pressure) has been lowered due to the hardening of the gas diffusion layers is further pressurized using press equipment. Then an insert 141 is mounted between each fastening bar 133 and a corresponding end plate 120 to increase the fastening force (surface pressure) to a desired level.

At this time, the length $L_{repaired}$ of the stack after repair is shorter than the original length $L_{original}$ of the stack before repair by the length $L_{insert}$ of the added insert.

In addition, FIG. 5 is a view exemplarily showing a case in which a dummy cell is further inserted between one of the end plates and a corresponding reaction cell to repair the stack. The stack of which fastening force (surface pressure) has been lowered is disassembled, a dummy cell 142 is inserted between one of the end plates 120 and a corresponding reaction cell 110, the end plates and the cells are further pressurized using press equipment, and then the end plates, the dummy cell, and the reaction cells are fastened using other fastening bars 133 each having a length suitable for increasing the fastening force (surface pressure) to a desired level.

In this case, the length $L_{repaired}$ of the stack after repair may be different from the original length $L_{original}$ of the stack before repair due to the insertion of the dummy cell 142.

FIG. 6 is a view exemplarily showing a stack having an elastic mechanism mounted therein to prevent a reduction of fastening force and surface pressure. When the surface pressure is lowered in a stack in which an elastic mechanism, such as springs 144, is mounted, the length of the stack is automatically reduced in real time by force of the springs in order to minimize a reduction of the surface pressure. The length of the stack decreases with the increase in length of the springs.

At this time, the elastic mechanism is structurally weak in a direction perpendicular to a cell stacking direction. When the stack is mounted in an enclosure or a frame, therefore, it is necessary to use a pressure plate 143 and an opposite end plate B.

As a result, the length $L_{repaired}$ of the stack after deformation of the elastic mechanism may be different from the original length $L_{original}$ of the stack before deformation of the elastic mechanism.

Application examples of such an elastic mechanism are disclosed in US Patent Application Publication No. 2009-0004533, No. 2005-0277012, and No. 2007-0042250.

Meanwhile, in a case in which the above methods are applied to solve a reduction of the fastening force and surface pressure, the length of the stack in the cell stacking direction is changed. Consequently, the following problems are caused when mounting the stack in the enclosure or the frame.

FIGS. 7 and 8 are views exemplarily showing conventional stack mounting structures. As shown in the figures, end plates 120a and 120b (a pressure plate for a stack having an elastic mechanism applied thereto) located at the opposite ends of the stack 100 are fastened and mounted to the enclosure or the frame 200 using brackets 151 and bolts 152 in a completely fixing fashion.

That is, the opposite ends of the stack 100 are completely fixed to the enclosure or the frame 200 in a fixed-fixed condition state.

When the cells are stacked in an X direction, therefore, translation and rotation of first and second mounting parts located at the opposite ends of the stack in X, Y, and Z directions are restricted. That is, a degree of freedom in all directions is restricted at the opposite ends of the stack. As a result, it is not possible to actively respond to the change in length of the stack by repair or by the use of the elastic mechanism.

SUMMARY OF THE DISCLOSURE

The present disclosure has been made in an effort to solve the above-described problems associated with prior art and it is an object of the present disclosure to provide an improved structure for mounting a fuel cell stack that mounts a fuel cell stack in an enclosure or a frame without structural modification even when a stack length (length in a cell stacking direction) is changed without restricting a degree of freedom to change the dimensions in a longitudinal direction of the stack.

In one aspect, the present disclosure provides a structure for mounting a fuel cell stack in an enclosure or a frame including a first mounting mechanism for fastening and mounting a first mounting part located at a first side of the fuel cell stack in a longitudinal direction of the stack, which is a cell stacking direction, to the enclosure or the frame in a completely fixing fashion, and a second mounting mechanism for mounting a second mounting part located at a second side of the fuel cell stack in the longitudinal direction of the stack to the enclosure or the frame in a state of being movable in the longitudinal direction of the stack.

In a preferred embodiment, the first mounting part and the second mounting part may be end plates disposed at opposite ends of the fuel cell stack.

In another preferred embodiment, one of the first mounting part and the second mounting part may be an end plate disposed at the first side of the fuel cell stack, and the other one may be a pressure plate for supporting the fuel cell stack in a pressurized fashion in a state in which an elastic member is interposed between the pressure plate and another end plate disposed at the second side of the fuel cell stack to automatically adjust surface pressure and fastening force of the stack.

In still another preferred embodiment, the second mounting mechanism may restrict translation of the second mounting part of the fuel cell stack in a direction perpendicular to the longitudinal direction of the stack and rotation of the second mounting part.

In yet another preferred embodiment, the second mounting mechanism may include a first component completely fixed to the second mounting part of the fuel cell stack and a second component mounted to the enclosure or the frame in a state of being coupled to the first component for guiding the first component in the longitudinal direction of the stack.

In still yet another preferred embodiment, the first component may be a supporting shaft extending from the second mounting part of the fuel cell stack, and the second component may be a linear guide member for guiding sliding of the supporting shaft in an axial direction in a state of being coupled to the supporting shaft.

In a further preferred embodiment, the linear guide member may be a linear ball bush coupled to the supporting shaft such that the supporting shaft extends through the linear ball bush, the linear ball bush having balls contacting the supporting shaft for guiding translation of the supporting shaft.

In another further preferred embodiment, the linear ball bush may be mounted in a mounting hole of the enclosure, and a lip seal for sealing between the supporting shaft and the mounting hole may be mounted in the mounting hole in a state in which the supporting shaft is coupled to the mounting hole such that the supporting shaft extends through the mounting hole.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIGS. 2 and 3 are views showing general fuel cell stack fastening fashions, wherein FIG. 2 shows a bolt fastening fashion, and FIG. 3 shows a fastening bar fastening fashion;

Figure 1:
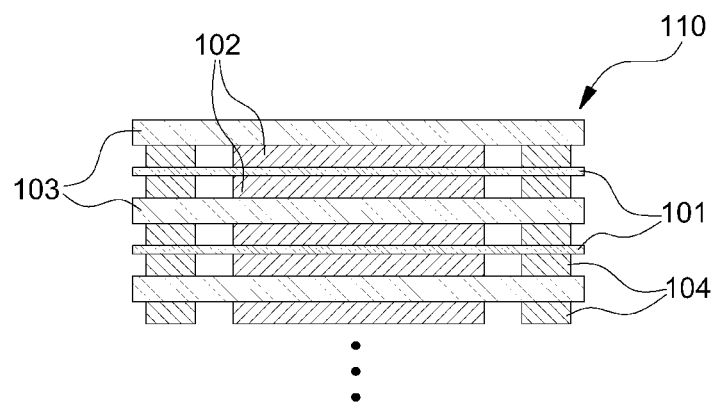
FIG. 1 is a view showing a configuration of a unit cell of a fuel cell.
Figure 2:
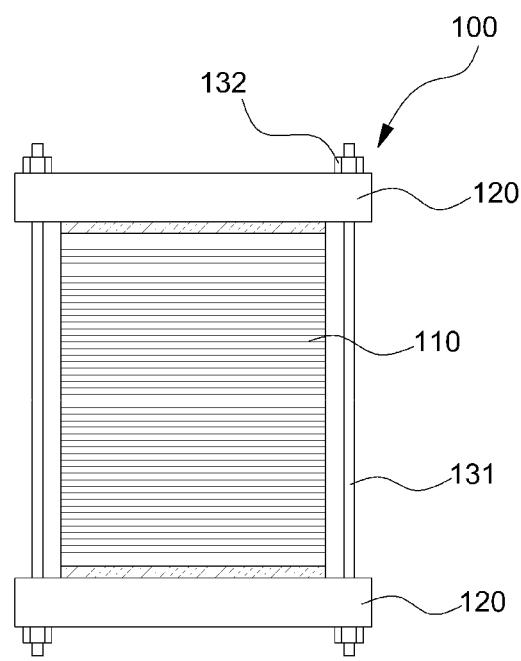
Figure 3:
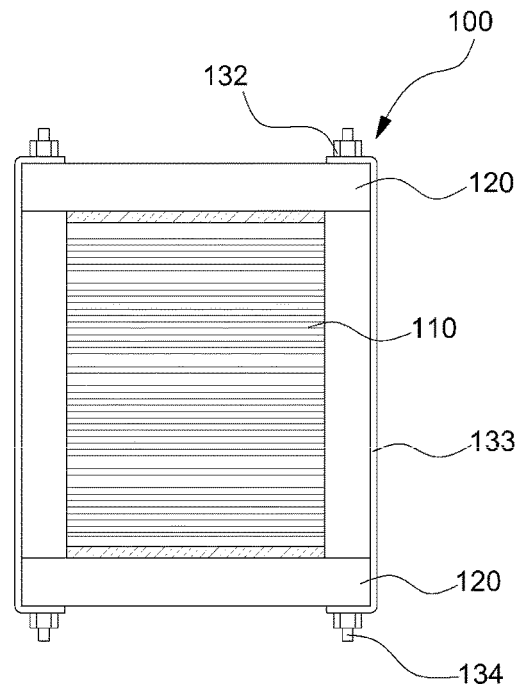

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure provides an improved structure for mounting a fuel cell stack that mounts a fuel cell stack in an enclosure or a frame without structural modification even when a stack length (length in a cell stacking direction) is changed without restricting a degree of freedom to change the dimensions in a longitudinal direction of the stack.

Figure 9:
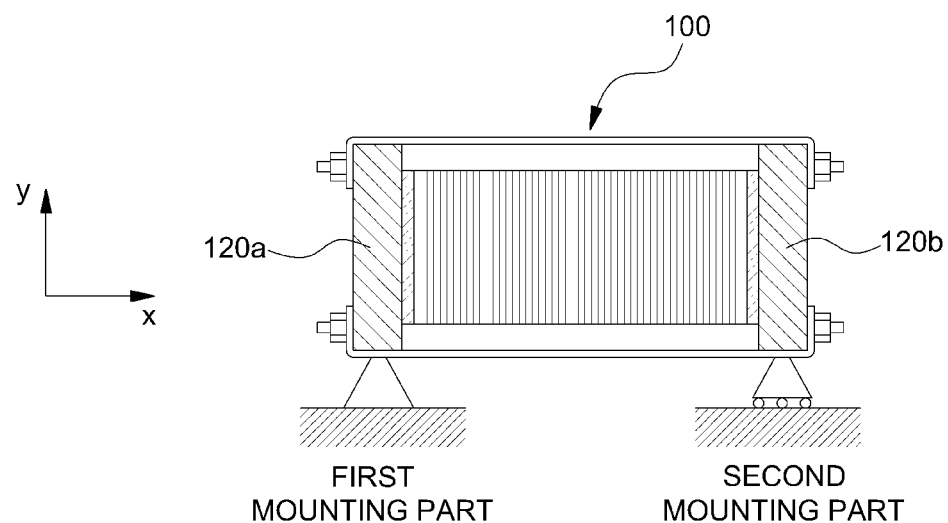
FIG. 9 is a view illustrating a concept of a stack mounting structure according to the present disclosure.
Figure 10:
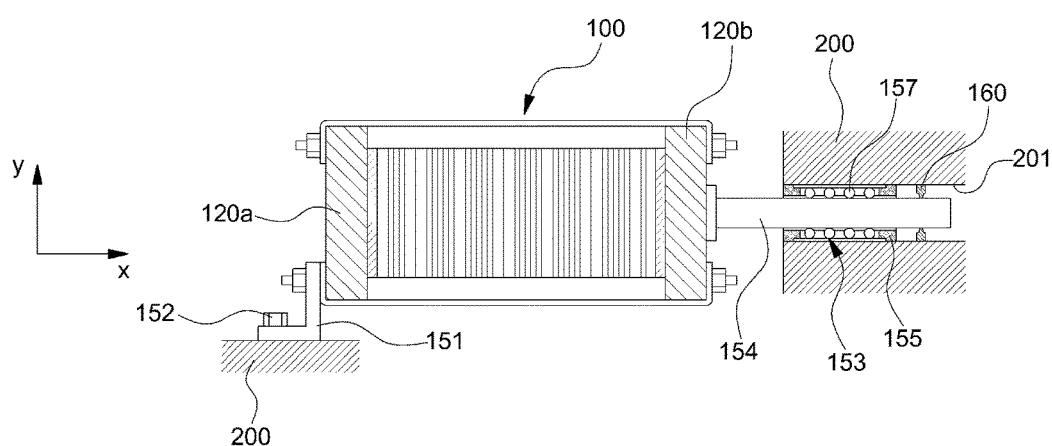
FIG. 10 is a view showing a stack mounting structure according to an embodiment of the present disclosure.

FIG. 9 is a view illustrating a concept of a stack mounting structure according to the present disclosure, and FIG. 10 is a view showing a stack mounting structure according to an embodiment of the present disclosure.

In this specification, a stack length means the direction in a cell stacking direction, and a stack length direction means a cell stacking direction. In FIGS. 9 and 10, the stack length direction is an X direction, and the stack length is a length in the X direction.

In addition, in FIGS. 9 and 10, a Y direction and a Z direction are defined as directions perpendicular to the X direction. The Y direction and the Z direction are perpendicular to a longitudinal direction (i.e. axial direction) of a supporting shaft, which will hereinafter be described.

The present disclosure includes a mounting mechanism that responds actively to a change in length of a repaired stack or a change in stack length due to an elastic mechanism to solve the reduction of surface pressure at a gas diffusion layer and a gasket (reduction of fastening force due to a stack fastening mechanism) caused during operation of the fuel cell stack.

Active response means that mounting parts of the stack are mounted in the enclosure or the frame without structural modification when the stack length is changed and also means that a stably mounted state of the mounting parts is automatically maintained when the stack length is changed in real time due to the elastic mechanism that automatically adjusts the surface pressure and fastening force of the stack.

Although FIGS. 9 and 10 do not show the fuel cell stack in detail, the fuel cell stack mounted using the mounting structure of the present disclosure may be a stack before the stack length is changed, i.e. a stack before repair or a stack of which length has not been adjusted by the elastic mechanism. In addition, the fuel cell stack may be a stack after the stack length is changed, i.e. a stack repaired to solve the reduction of surface pressure and fastening force or a stack of which surface pressure and fastening force have been adjusted by the elastic mechanism.

Figure 4:
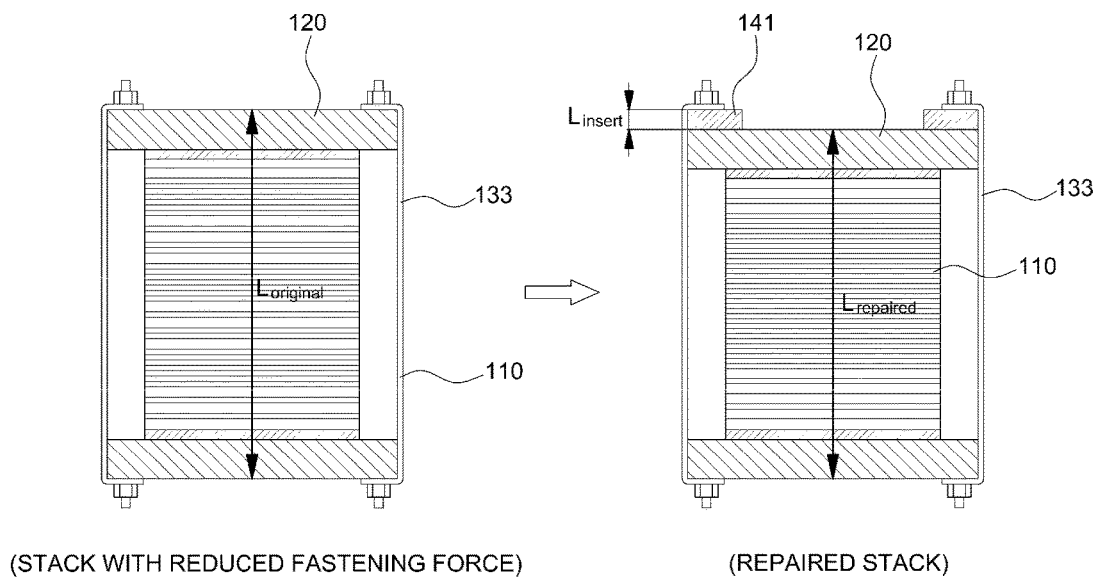
FIG. 4 is a view exemplarily showing a case in which an insert is inserted between a fastening bar and an end plate for repair to solve a reduction of fastening force and surface pressure.
Figure 5:
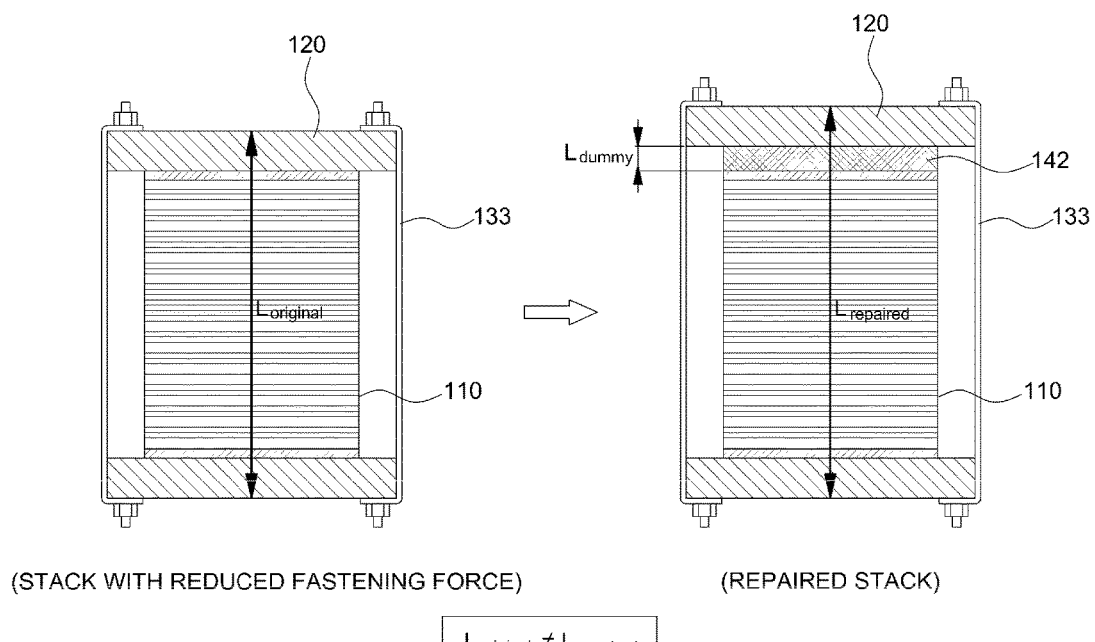
FIG. 5 is a view exemplarily showing a case in which a dummy cell is further inserted between an end plate and a reaction cell for repair to solve a reduction of fastening force and surface pressure.
Figure 6:
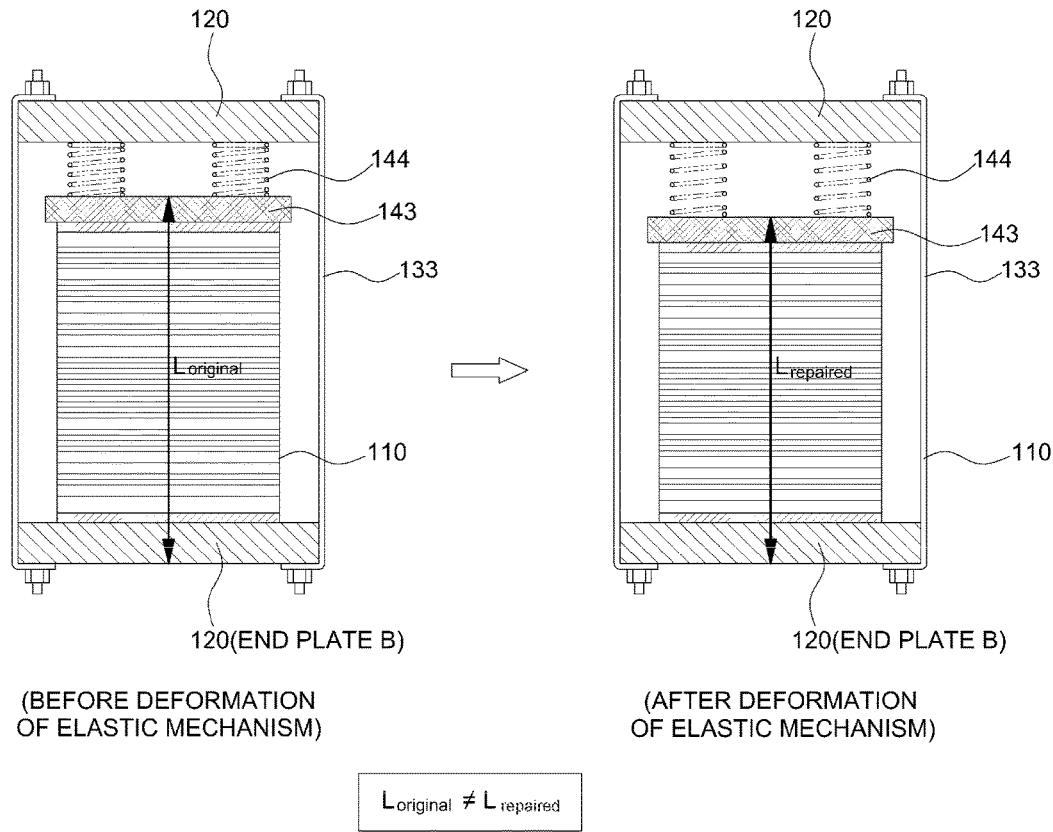
FIG. 6 is a view exemplarily showing a stack having an elastic mechanism mounted therein to prevent reduction in fastening force and surface pressure.
Figure 7:
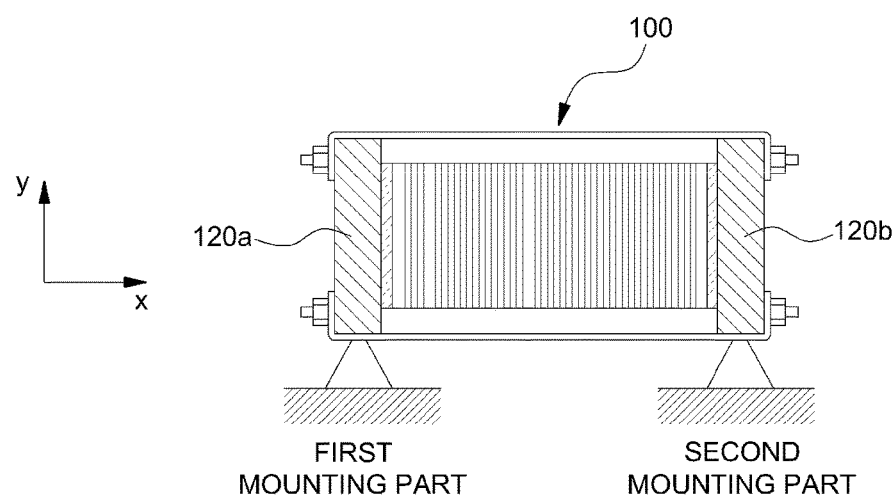
FIGS. 7 and 8 are views exemplarily showing conventional stack mounting structures.
Figure 8:
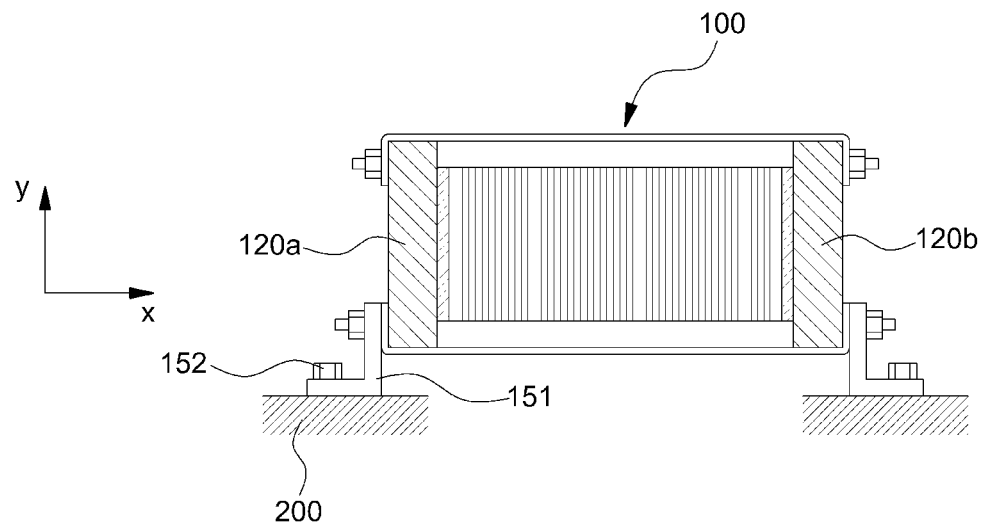

Of course, the change in length of the stack may mean a length change caused by using a method of mounting an insert at the inside of each fastening bar, a method of further inserting a dummy cell, a method of replacing each fastening bar with a short fastening bar, or a method of mounting an elastic mechanism as shown in FIGS. 4 to 6. However, the present disclosure is not limited thereto. The technical concept of the present disclosure may be applied to any change in length of the stack, including the change in length of the stack caused when solving the surface pressure and fastening force reduction problems.

The insert, the dummy cell, and the elastic member will be omitted from the figures.

Referring to FIG. 9, a mounting mechanism (hereinafter referred to as a 'first mounting mechanism') for fastening and mounting a stack 100 to an enclosure or a frame 200 in a completely fixing fashion in the same manner as in the conventional art is applied to one of the mounting parts provided at opposite ends of the stack 100, i.e. a first mounting part.

At this time, the first mounting part of the stack 100 may be an end plate 120a, and the first mounting mechanism for mounting the first mounting part may be a bracket 151 and a bolt 152 for integrally and completely fixing the end plate 120a to the enclosure or the frame 200 in the same manner as in the conventional art.

Consequently, translation and rotation of the first mounting part of the stack 100 in the X, Y, and Z directions are restricted.

A novel mounting mechanism 153 proposed by the present disclosure, i.e. a mounting mechanism (hereinafter referred to as a 'second mounting mechanism') providing a degree of freedom in translation in the X direction, is applied to the other of the mounting parts provided at the opposite ends of the stack 100, i.e. a second mounting part.

In the present disclosure, therefore, a mounted state of the stack 100 is a fixed-sliding condition state in which translation of one end of the stack in the X direction is not restricted. The second mounting mechanism 153 for supporting the second mounting part is configured to provide a state in which the translation of the second mounting part in the X direction is possible due to relative sliding between a first component 154 completely fixed to the second mounting part and a second component 155 completely fixed to the enclosure or the frame 200.

That is, the second mounting mechanism 153 for supporting the second mounting part is divided into the first component 154 and the second component 155, such that the second mounting part of the stack 100 has a degree of freedom in translation in the X direction. The first component 154 and the second component 155 are assembled in a structure in which the first component may slide relative to the second component in the X direction.

Consequently, translation of the second mounting part in the Y and Z directions, which are perpendicular to the X direction, is restricted, but translation of the second mounting part in the X direction is allowed. However, rotation of the second mounting part in the X, Y, and Z directions is restricted in the same manner as in the first mounting part.

The second mounting part may be an end plate 120b located opposite to the first mounting part. In a case in which the elastic mechanism is used, the second mounting part may be a pressure plate 143 (see FIG. 6).

Of course, in a case in which the elastic mechanism is applied to the stack, the first mounting part may be a pressure plate, and the second mounting part may be an end plate located opposite to the pressure plate.

A configuration of a mounting structure according to an embodiment of the present disclosure will be described with reference to FIG. 10.

First, a second mounting mechanism 153 for supporting a second mounting part 120b in an enclosure or a frame 200 includes a first component 154 fixedly mounted to the second mounting part of a fuel cell stack 100 and a second component 155 fixedly mounted to the enclosure for receiving the fuel cell stack in a surrounding fashion in a thermally insulated state or to the frame 200 in which the fuel cell stack is mounted.

More specifically, the first component 154 is fixed to an end plate 120b corresponding to the second mounting part or to a pressure plate for supporting stacked cells in a pressurized state while being supported by an elastic member, such as a spring, located between an elastic mechanism in the fuel cell stack and the end plate. The first component 154 is coupled to the second component 155 such that the first component 154 slides relative to the second component 155 in a longitudinal direction of the stack, i.e. in an X direction.

Although the first component 154 can slide relative to the second component 155 in the X direction, translation of the first component 154 in the other directions, i.e. a Y direction and a Z direction, is restricted. In addition, rotation of the first component 154 in the X, Y, Z directions is restricted by the second component 155.

The second component 155 is mounted at a mounting surface of the enclosure or the frame 200 opposite to the outside of the end plate 120b of the stack 100. The second component 155 is coupled to the first component so as to guide sliding of the first component 154 in the X direction while supporting the first component 154 in a state in which the second component 155 is mounted in the enclosure or the frame 200.

In a preferred embodiment, as shown in FIG. 10, the first component 154 may be a support shaft mounted at the end plate 120b of the stack 100 so as to extend in the longitudinal direction of the stack, and the second component 155 may be a linear guide member that guides sliding of the supporting shaft in an axial direction in a state of being coupled to the supporting shaft 154.

In this embodiment, in a case in which the second mounting part to which the supporting shaft 154 is fixed is the end plate 120b, the supporting shaft 154 may be fixedly mounted to the outside of the end plate in the longitudinal direction of the stack. In a case in which the second mounting part is a pressure plate 143 (see FIG. 6), the supporting shaft 154 may be fixedly mounted to the outside of the pressure plate in the longitudinal direction of the stack and may be coupled to the linear guide member 155 through the end plate 120b located such that a spring 144 (see FIG. 6) is interposed between the pressure plate and the end plate 120b.

Figure 11:
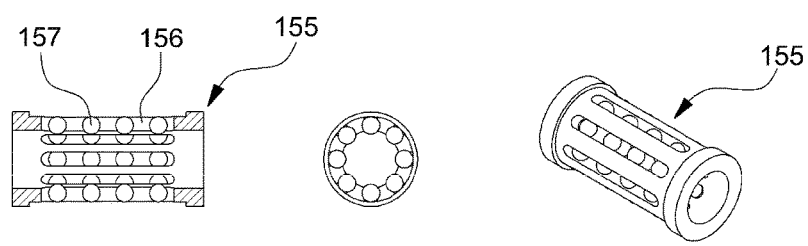
FIG. 11 is a view exemplarily showing a linear ball bush in the stack mounting structure according to the embodiment of the present disclosure.

In another preferred embodiment, the linear guide member 155 may be a linear ball bush, to the inside of which the supporting shaft 154 is coupled. The linear ball bush 155 is widely used as a component for guiding translation of an axial element in an axial direction. FIG. 11 shows an example of the linear ball bush.

As shown in the figure, the linear ball bush 155 is formed in the shape of a cylinder, in which balls 157 for guiding translation of the supporting shaft 154 in contact with the supporting shaft 154 are mounted. The balls 157 are movably inserted in ball guides 156 extending in a direction parallel to the axial direction of the supporting shaft 154.

The ball guides 156 of the linear ball bush 155 are arranged at predetermined intervals in a circumferential direction of the linear ball bush. The balls 157 are mounted along the respective ball guides 156 to support the supporting shaft 154 located inside the ball guides 156 in a rolling contact fashion.

When the supporting shaft 154 is coupled into the linear ball bush 155 such that the supporting shaft 154 extends through the linear ball bush 155 to mount the fuel cell stack 100, the supporting shaft is supported in the linear ball bush 155 such that the supporting shaft moves in the axial direction to respond to the dimensional change of the stack in the longitudinal direction.

In the structure in which the second mounting mechanism 153, constituted by a combination of the supporting shaft 154 and the linear ball bush 155, is mounted to support the second mounting part, i.e. the end plate 120b, to respond to the dimensional change of the stack in the longitudinal direction as described above, a plurality of supporting shafts and a plurality of linear ball bushes may be provided to stably support the stack and to restrict rotation of the stack although a single supporting shaft 154 and a single linear ball bush 155 are provided as shown in FIG. 10. In this case, all of the supporting shafts 154 may be mounted so as to move relative to the linear ball bushes 155 fixedly mounted in the enclosure or the frame 200 in the X direction.

In addition, in a case in which the linear ball bush 155 is mounted in the enclosure 200 in a structure in which the supporting shaft 154 and the linear ball bush 155 are used to allow displacement of the stack in the longitudinal direction, the linear ball bush 155 may be mounted inside a mounting hole 201 of the enclosure 200, and a lip seal 160 may be mounted in the mounting hole 201 outside the linear ball bush 155.

The lip seal 160 seals between the supporting shaft 154 and the mounting hole 201 to secure watertightness of the enclosure 200. The lip seal 160 is formed in an annular shape. The lip seal 160 is assembled in the mounting hole 201 of the enclosure 200 such that the supporting shaft extends through the mounting hole 201. A lip part formed at the inner circumference of the lip seal 160 contacts the supporting shaft 154 to maintain watertightness or airtightness.

As is apparent from the above description, a structure for mounting a fuel cell stack according to the present disclosure is configured such that one of the mounting parts of the fuel cell stack is mounted in an enclosure or a frame in a state of being movable in a longitudinal direction of the stack, thereby mounting the fuel cell stack in the enclosure or the frame without structural modification when a stack length (length in a cell stacking direction) is changed without restricting a degree of freedom to change the dimensions in a longitudinal direction of the stack.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A structure for mounting a fuel cell stack in an enclosure or a frame, the structure comprising:
   a first mounting mechanism for fastening and mounting a first mounting part located at a first side of the fuel cell stack in a longitudinal direction of the stack, which is a cell stacking direction, to the enclosure or the frame in a completely fixing fashion; and
   a second mounting mechanism for mounting a second mounting part located at a second side of the fuel cell stack in the longitudinal direction of the stack to the enclosure or the frame in a state of being movable in the longitudinal direction of the stack with respect to the enclosure or the frame installed outside the fuel cell stack.

2. The structure of claim 1, wherein the first mounting part and the second mounting part are end plates disposed at opposite ends of the fuel cell stack.

3. The structure of claim 1, wherein
   one of the first mounting part and the second mounting part is an end plate disposed at the first side of the fuel cell stack, and
   the other of the first mounting part and the second mounting part is a pressure plate for supporting the fuel cell stack in a pressurized fashion in a state in which an elastic member is interposed between the pressure plate and another end plate disposed at the second side of the fuel cell stack to automatically adjust surface pressure and fastening force of the stack.

4. The structure of claim 1, wherein the second mounting mechanism restricts translation of the second mounting part of the fuel cell stack in a direction perpendicular to the longitudinal direction of the stack and rotation of the second mounting part.

5. The structure of claim 1, wherein the second mounting mechanism comprises:
   a first component completely fixed to the second mounting part of the fuel cell stack; and
   a second component mounted to the enclosure or the frame in a state of being coupled to the first component for guiding the first component in the longitudinal direction of the stack.

6. The structure of claim 5, wherein the first component is a supporting shaft extending from the second mounting part of the fuel cell stack, and the second component is a linear guide member for guiding sliding of the supporting shaft in an axial direction in a state of being coupled to the supporting shaft.

7. The structure of claim 6, wherein the linear guide member is a linear ball bush coupled to the supporting shaft such that the supporting shaft extends through the linear ball bush, the linear ball bush having balls contacting the supporting shaft for guiding translation of the supporting shaft.

8. The structure of claim 7, wherein the linear ball bush is mounted in a mounting hole of the enclosure, and a lip seal for sealing between the supporting shaft and the mounting hole is mounted in the mounting hole in a state in which the supporting shaft is coupled to the mounting hole such that the supporting shaft extends through the mounting hole.

* * * * *